(12) United States Patent
Carpenter et al.

(10) Patent No.: US 7,769,993 B2
(45) Date of Patent: Aug. 3, 2010

(54) METHOD FOR ENSURING BOOT SOURCE INTEGRITY OF A COMPUTING SYSTEM

(75) Inventors: Todd L. Carpenter, Monroe, WA (US); William J. Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 11/684,312

(22) Filed: Mar. 9, 2007

(65) Prior Publication Data

US 2008/0222407 A1 Sep. 11, 2008

(51) Int. Cl.
*G06F 9/00* (2006.01)
(52) U.S. Cl. .................. 713/2; 726/21; 726/23
(58) Field of Classification Search .......... 713/2, 713/194; 726/4, 23, 21
See application file for complete search history.

(56) References Cited

U.S. PATENT DOCUMENTS

| | | | |
|---|---|---|---|
| 4,757,533 A | | 7/1988 | Allen et al. |
| 5,937,063 A | * | 8/1999 | Davis .................... 713/187 |
| 5,951,685 A | | 9/1999 | Stancil |
| 6,185,678 B1 | | 2/2001 | Arbaugh et al. |
| 6,463,535 B1 | | 10/2002 | Drews |
| 6,473,857 B1 | | 10/2002 | Panas et al. |
| 6,560,706 B1 | | 5/2003 | Carbajal et al. |
| 6,625,730 B1 | | 9/2003 | Angelo et al. |
| 6,654,816 B1 | | 11/2003 | Zaudtke et al. |
| 7,036,023 B2 | | 4/2006 | Fries et al. |
| 7,051,196 B2 | * | 5/2006 | Angelo et al. .................. 713/1 |
| 7,103,529 B2 | | 9/2006 | Zimmer |
| 7,191,464 B2 | * | 3/2007 | Cromer et al. .................. 726/2 |
| 7,243,240 B2 | * | 7/2007 | Wang ........................ 713/189 |
| 7,386,713 B2 | * | 6/2008 | Madter et al. .................. 713/2 |
| 2004/0024580 A1 | | 2/2004 | Salmonsen et al. |
| 2005/0138409 A1 | | 6/2005 | Sheriff et al. |
| 2005/0283601 A1 | | 12/2005 | Tahan |
| 2006/0129791 A1 | | 6/2006 | Kwon |
| 2006/0143431 A1 | | 6/2006 | Rothman et al. |
| 2007/0050297 A1 | * | 3/2007 | Xu et al. ........................ 705/52 |
| 2008/0077986 A1 | * | 3/2008 | Rivera et al. .................. 726/20 |
| 2008/0148036 A1 | * | 6/2008 | Westerinen et al. ............ 713/2 |

OTHER PUBLICATIONS

International Search Report for PCT/US2008/056386 mailed Jul. 11, 2008.
Written Opinion for PCT/US2008/056386 mailed Jul. 11, 2008.
Arbaugh et al., "Automated Recovery in a Secure Bootstrap Process," Nov. 21, 1997, http://www1.cs.columbia.edu/~angelos/Papers/secure-bootstrap.pdf.
"Trusted Mobile Platform : Hardware Architecture Description," 2002-2004 Intel Corporation, http://www.trusted-mobile.org/TMP_HWAD_rev1_00.pdf.

* cited by examiner

*Primary Examiner*—Chun Cao
(74) *Attorney, Agent, or Firm*—Marshall, Gerstein & Borun LLP

(57) ABSTRACT

A security circuit in a computer monitors data busses that support memory capable of booting the computer during the computer reset/boot cycle. When activity oil one of the data busses indicates the computer is booting from a non-authorized memory location, the security circuit disrupts the computer, for example, by causing a reset. Execution from the non-authorized memory location may occur when an initial jump address at a known location, such as the top of memory, is re-programmed to a memory location having a rogue BIOS program.

19 Claims, 5 Drawing Sheets

METHOD FOR ENSURING BOOT SOURCE INTEGRITY OF A COMPUTING SYSTEM

BACKGROUND

Starting up a computer, or booting, is the process activating the computer from a small program and successively loading and activating more and more programs until Finally a complete operating system and other associated network, storage, and peripheral support Because the very first program to run, usually a basic input/output system, or BIOS, controls the platform on which every other process and application runs, it is often desirable, if not essential, to have a computer startup using a known boot program. An unqualified, or even malicious, BIOS program can propagate viruses, spyware, capture keystrokes and passwords, and lay the computer open to circumvention of every security measure afforded by later-loaded protection software.

Therefore, it is desirable to ensure that a known, qualified, BIOS is initially loaded and executed. Many attempts to ensure booting with the correct BIOS include measures to cryptographically verify a BIOS before it is loaded and run. This, however, often requires yet another program to be installed and run before the BIOS is loaded. The problem of rogue programs often just moved one step lower in the startup process.

There are several ways to defeat a secure boot process in a computer. A first is to re-program or replace the BIOS in a boot memory. By replacing the boot program, the computer can load, and possibly execute, code used to subvert security steps taken by later-executed programs, such as the operating system. Another method can be to replace the jump vectors that point to the authorized BIOS and have the computer boot from a BIOS from another location.

The vast majority of computers use the same "well known address", originally, 0xFFFFFFF0, to begin execution of the software portion of the boot process. This address maps to a location on a device containing persistent storage, often referred to as BIOS ROM, from which the computer will fetch the first instruction, in most cases the first instruction of the BIOS program. The system chipset hardware, e.g. a Northbridge/Southbridge or equivalent, will determine which device's persistent storageis pointed to by that address and cause the appropriate location from the device's persistent storage to be read, and then executed. There are several system busses (PCI, LPC, SPI, etc) that are capable of hosting devices that contain persistent storage that could contain the BIOS needed to boot the platform. Resistors tied to pins on the system chipset, are used to set the target system bus that is to be used to boot the system. By changing the resistors, a hacker could divert execution from the intended device to a second device with boot code selected by the hacker.

Alternatively, a more sophisticated hacker could monitor the system bus and cause the boot address to he misread by forcing data on the system bus. The result of either or these latter two attacks is to cause the computer to boot from a non-authorized location that would, presumably, circumvent a security model imposed through the correct boot code.

SUMMARY

A computer may incorporate a bus monitor that determines when the boot sequence calls a non-authorized memory device for execution of initial boot instructions. When non-authorized memory is accessed, an appropriate action may be taken, such as forcing a reboot. The bus monitor may be connected with the memory having the correct BIOS, so activity on a different bus during the initial boot cycle, such as on a low pin count (LPC) bus may be easily detected.

DETAILED DESCRIPTION

Although the following text sets forth a detailed description of numerous different embodiments, it should be understood that the legal scope of the description is defined by the words of the claims set forth at the end of this disclosure. The detailed description is to he construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
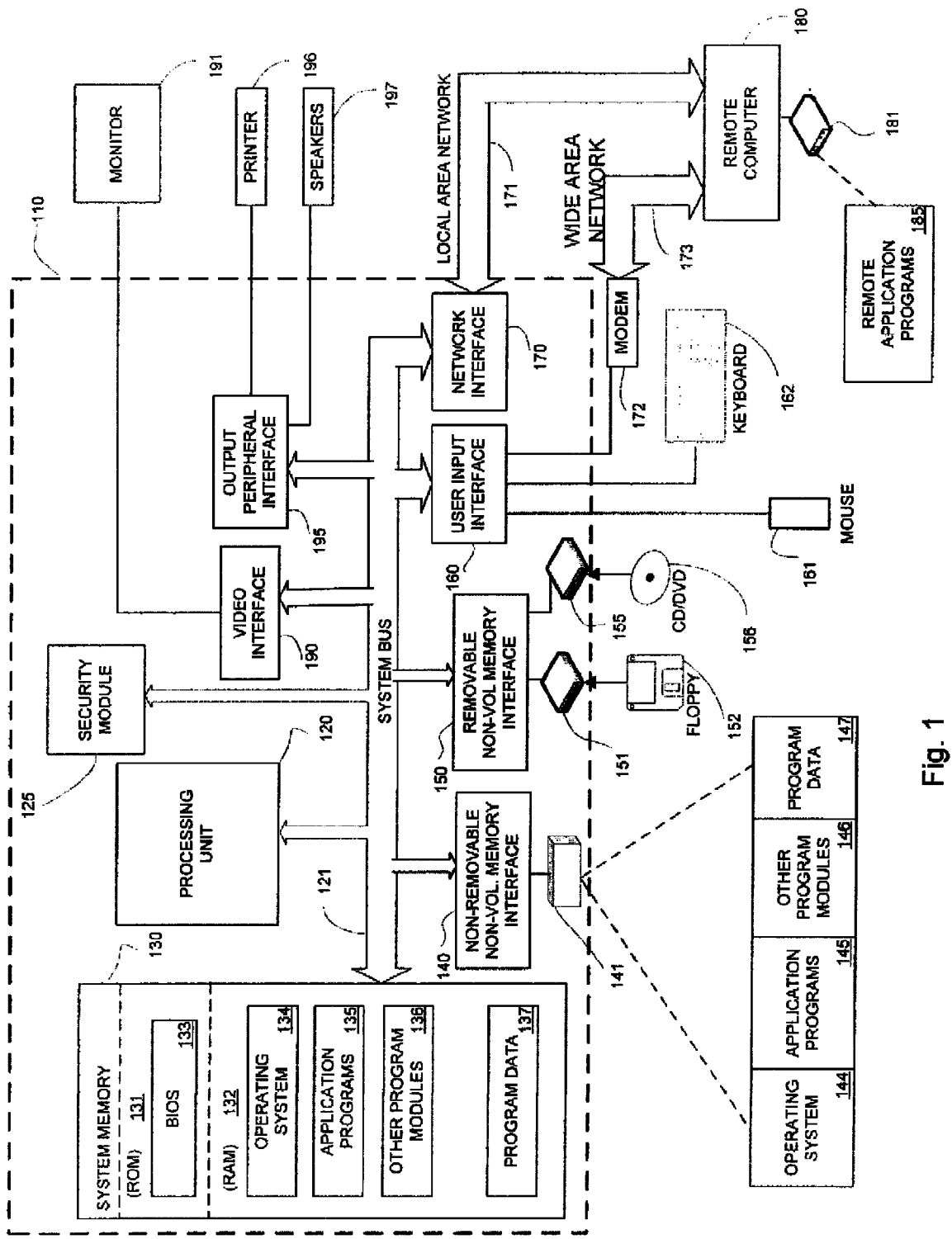
FIG. 1 is a block diagram of a simplified and representative computer in accordance with the current disclosure.

FIG. 1 illustrates a computing device in the form of a computer 110 incorporating a security device to monitor boot activity. Components of the computer 110 may include, but are not limited to a processing unit 120, a system memory 130, and a system bus 121 that couples various system components, including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and a Peripheral Component Interconnect (PCI) bus or any of its variations such as PCI-express (PCIe) or PCI-extended (PCI-X).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Computer storage media typically embodies computer readable instructions, data structures, program modules or other data.

The system memory 130 includes computer storage media in the form of volatile and/or nonvolatile memory such as read only memory (ROM) 131 and random access memory (RAM) 132. The system memory 130 may be in more than one physical memory device, or may be external to the computer 110. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such newtorking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof may be stored in the remote memory storage device. By way of example, and not limitation, FIG. 1 illustrates remote application programs 185 as residing on memory device 181.

A security module 125 may be deployed and configured to enforce the terms of an agreement between a user of the computer 110 and a service provider with an interest in the computer 110. The security module 125 may be instantiated in more than one manner. When implemented by one or more discrete components, the security module 125 may be disposed on the motherboard (not depicted) or in a multi-chip module (MCM) that is, itself, disposed on the motherboard. The security module is discussed in more detail below with respect to FIG. 3.

Figure 2:
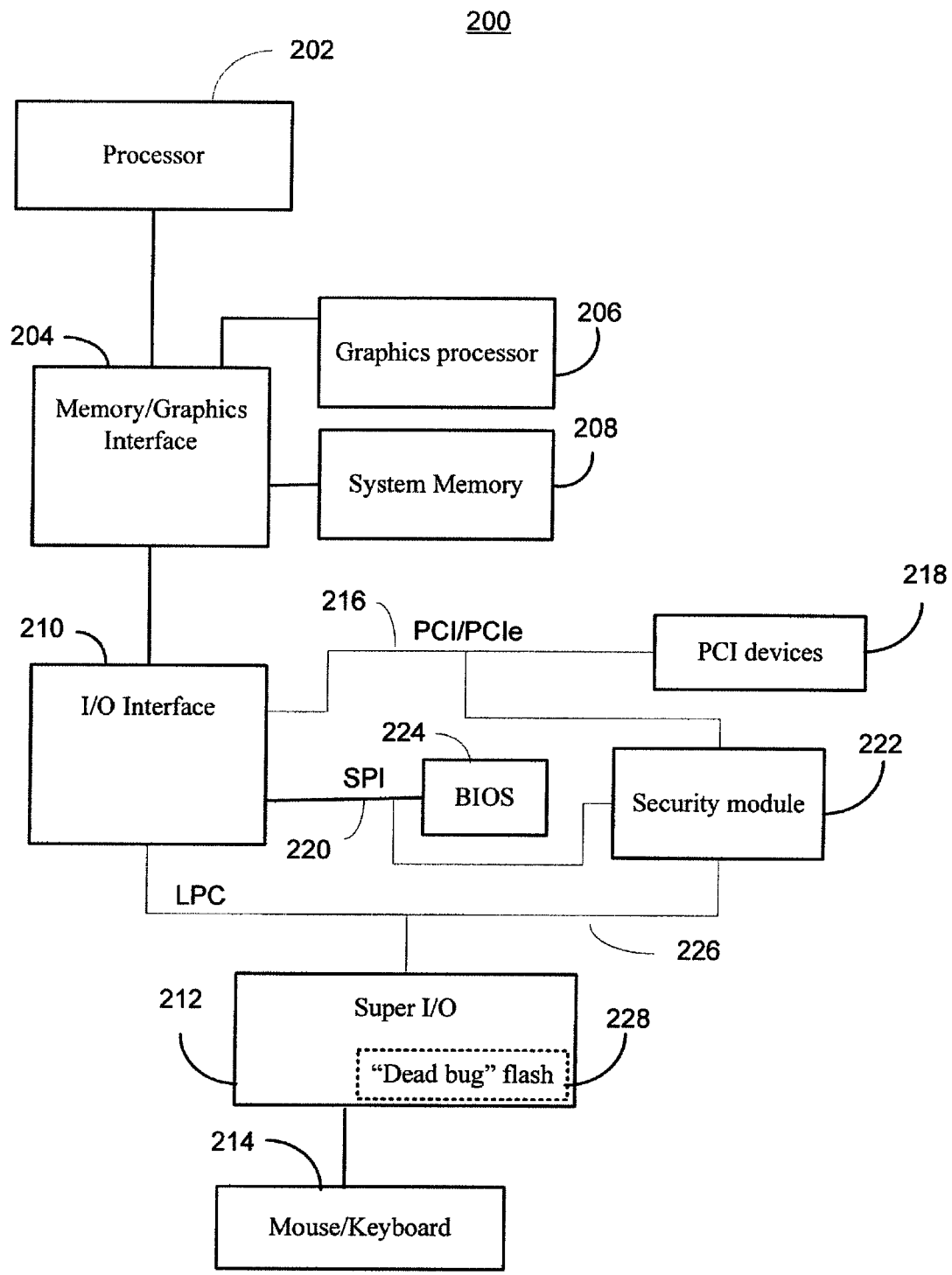
FIG. 2 is a simplified and representative architectural view of the computer of FIG. 1.

FIG. 2 is a simplified and representative architectural view of a computer 200, such as the representative computer of FIG. 1. A processor 202 for processing executable instructions may be coupled to a memory/graphics interface 204 that is used to interface to a graphics processor 206 and system memory 208. The processor 202 may be a processor or CPU known in the art, such processors available from Intel, AMD, and others. The memory/graphics interface 204 may be a "Northbridge" circuit or equivalent used in many common computer architectures. An I/O interface 210 may be used to couple the processor, either directly or through the memory/ graphics interface 204, to a variety of peripheral circuits through one or more data busses. An interface circuit called a Super I/O 212 may be used to support standard peripherals such as a mouse/keyboard 214 over a bus such as a low pin count (LPC) bus 226.

A PCI/PCIe bus 216 may be used to couple the I/O interface 210 to other PCI devices 218 such as, a network interface or add-on display controller (not depicted). A serial peripheral interface (SPI) bus 220 may couple to any number of SPI devices such as small computer system interface (SCSI) adapters, network interfaces, and memory (not depicted). A security module 222 may be coupled to each of the busses capable of supporting memory having BIOS programs. A common configuration of computers of this architecture, shown in FIG. 2, uses a memory device 224 on the SPI bus to store system boot code known as a basic input/output system (BIOS) that is used to boot the computer 200. Another configuration, shown in FIG. 2A, places the security module 222 between the I/O interface and the BIOS memory 224. In yet another embodiment, the BIOS memory 224 is incorporated in the security module 222, as shown in FIG. 3.

In operation, during a reset cycle, either a cold or warm boot, an initial jump address is fetched from address 0xFFFFFFF0. The system bus and device location of the persistent storage that maps the jump address may be set by pull-up or pull-down resistors (not depicted) on the system chipset. In an exemplary embodiment, the jump address points to a memory location in the address space of the I/O interface 210. The I/O interface 210 further determines that the memory is serviced by the SPI bus 220, and more specifically by the BIOS memory 224. However, the jump address may be altered or the data lines tampered such that the processor 202 looks for boot code other than that supported by the security module 222. One example of such a hack may be illustrated by the use of a "dead bug" flash memory 228 which may be connected to the super I/O chip 212 or even the mouse keyboard 214. The so-called dead bug flash memory 228 may be tacked onto a circuit board and it's leads soldered to the appropriate address and data lines to be accessible at the hacked boot jump address.

The security module 222, by monitoring each buses, such as the PCI bus 216, SPI bus 220, and the LPC bus 226, may determine which memory on those buses is being used to boot the computer 200. Should an unauthorized memory, in this exemplary embodiment, on the LPC or PCI/PCIe bus be used for booting instead of the authorized BIOS memory 224, the security module may determine this tampering and take action. The security module 222 can determine tampering because the initial memory accesses following a reset are always to the initial boot memory and should only be to the authorized location on the correct bus. WI he the security module 222 determines that unauthorized memory is being accessed to support booting, the security module 222 may disrupt the operation of the computer 200. Two of the many ways of disrupting the operation of the computer 200 are to reset the computer 200 using an output coupled to a reset line, or may halt operations by setting a Power OK signals that effectively disables the major peripheral such as the memory graphics interface 204 and the I/O interface 210.

Figure 2A:
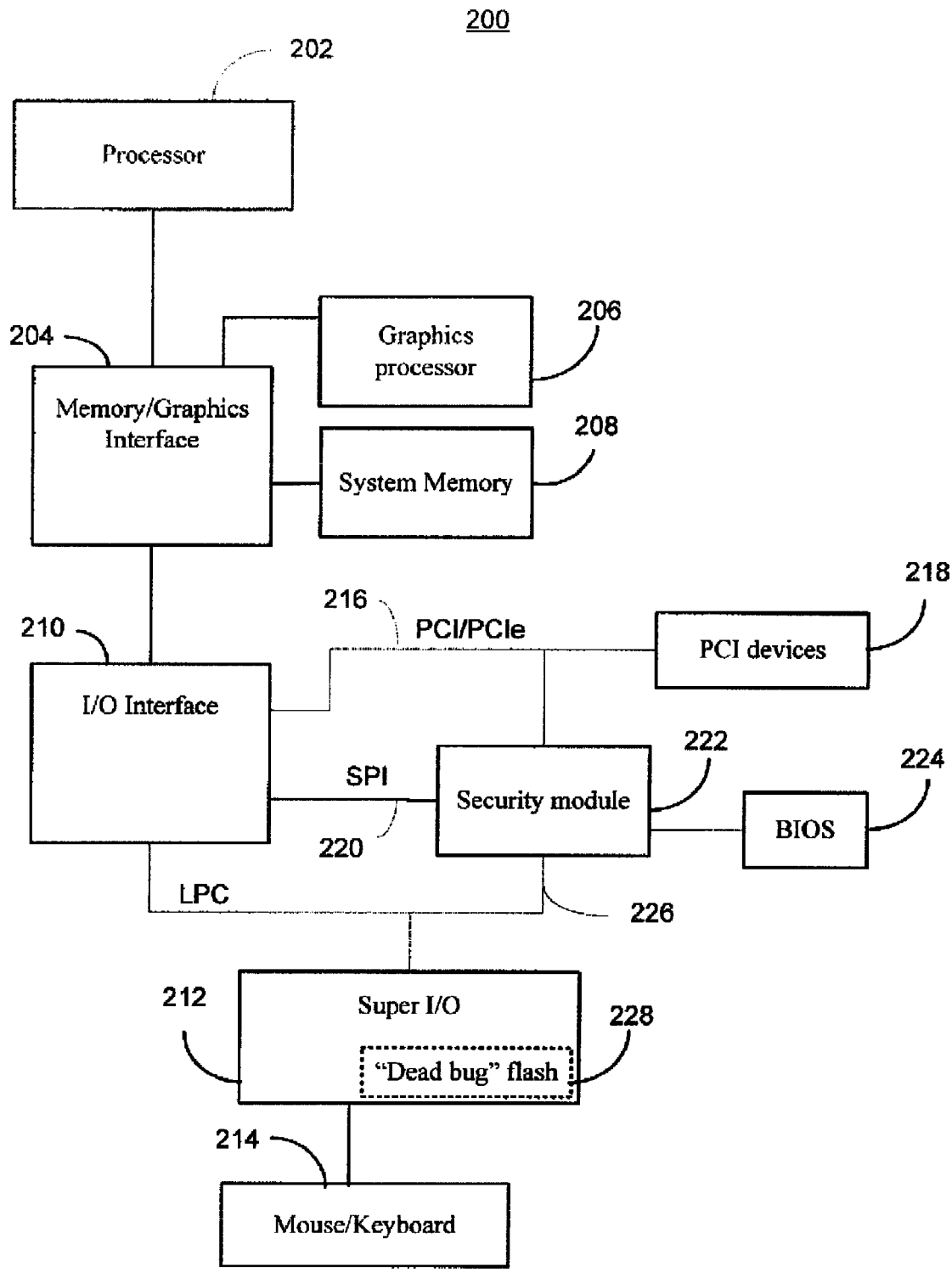
FIG. 2A is an alternate configuration of the architectural view of the computer of FIG. 2.
Figure 3:
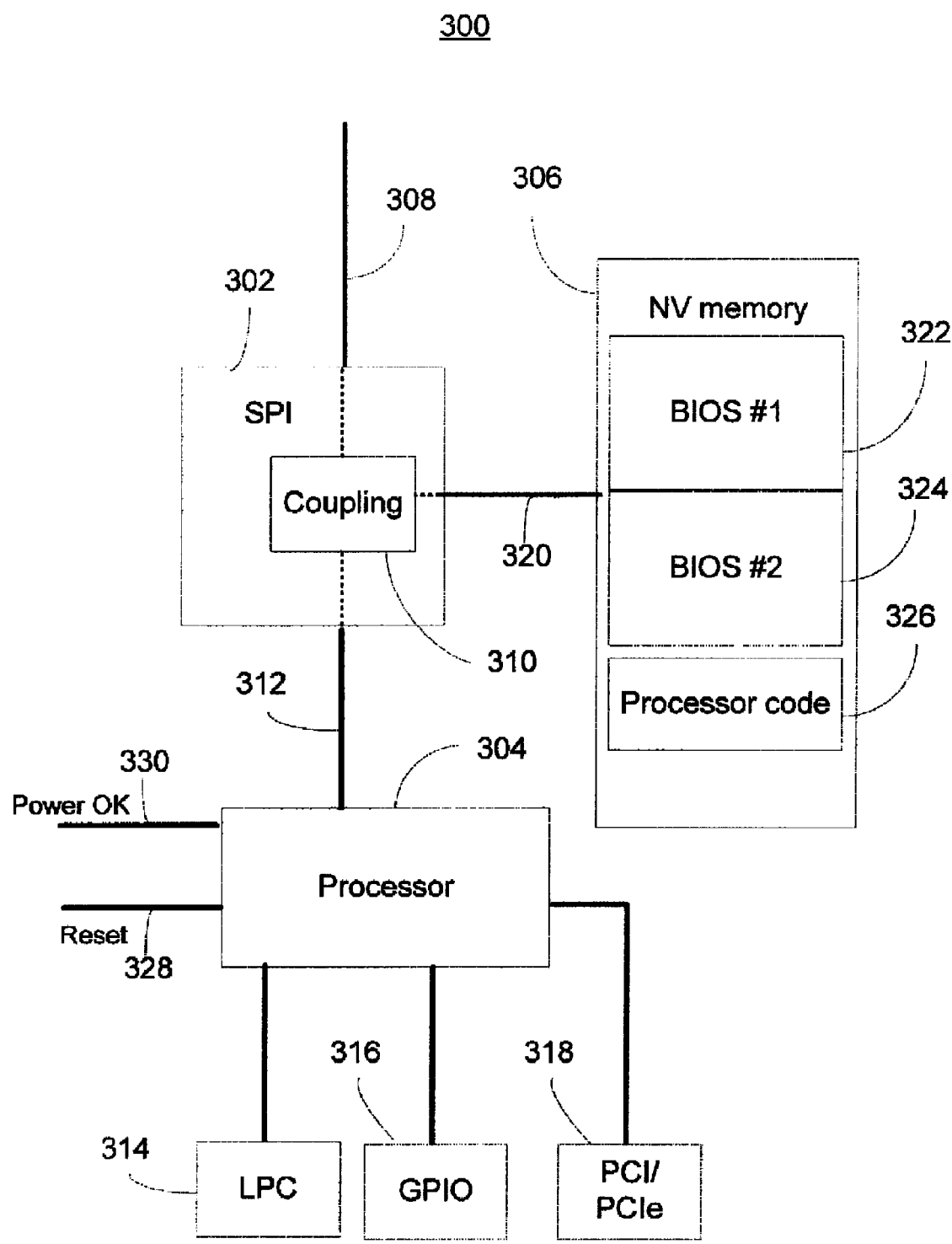
FIG. 3 is a simplified and representative block diagram of a security module.

FIG. 2A shows a similar configuration of the computer 200 with the BIOS memory 224 behind the security module 222. The boot operation is the same, with a difference being that the security module 222 has an even higher level of confidence that the correct memory is being used for booting because the security module 222 handles the data traffic with the BIOS memory 224.

FIG. 3 depicts a security module 300, similar to the security module 222 of FIGS. 2 and 2A. The exemplary embodiment of the security module 300 is but one example of a security module suitable for use in this application. As discussed above, the security module may or may not have integrated BIOS memory or may have such memory coupled through a bus other than an SPI bus. As shown in FIG. 3, an SPI interface 302 may be coupled to a processor 304 and a nonvolatile memory 306. The SPI interface 302 may have an external connection 308 to an SPI master device, such as I/O interface 210 of FIG. 2. A coupling 310 may allow the processor 304 to monitor, or even intervene, in nonvolatile memory 306 access via the SPI bus 308. The connection 312 between a coupling 310 and the processor 304 may be another SPI bus, or may be a bus native to the processor 304.

The processor 304 may be coupled to other exemplary additional bus interfaces such as an LPC interface 314, a GPIO interface 316, or a PCI interface 318. In other embodiments, more or fewer busses may be connected to the processor 304. The nonvolatile memory 306 may be connected to the SPI interface 302 via a second SPI connection 320, allowing the nonvolatile memory 306 to be accessed as if it were directly connected to its SPI master device. The nonvolatile memory 306 may include partitions for a first BIOS 322, a second BIOS 324, as well as executable processor code 326 used by the processor 304. At reset output 328 may be used by the processor 304 to cause an interruption in operation of a computer incorporating the security device 300, such as computer 200 of FIG. 2 or 2A.

The SPI interface 302 may be an application specific circuit to incorporate the coupling 310 that allows monitoring of the SPI bus 308. When the SPI interface 302 is not used for access to the nonvolatile memory 306, it may be a standard SPI slave interface known and available in the commodity marketplace, as are the LPC, GPIO, and PCI interfaces.

The processor 304 may be a single-chip processor such as an ARM processor from ARM Ltd of Cambridge UK, although similar processors from Intel and Freescale Semiconductor are also available. The nonvolatile memory 306 may be a flash technology device widely available in the commercial marketplace.

In operation the processor 304 may monitor activity on each of the connected busses, in this example, the SPI bus 308, the LPC bus 314, the GPIO bus 316, and the PCI bus 318. When reset activity is detected, for example, when a Power OK signal 330 transitions from inactive to active, the computer's processor, such as processor 202 of FIG. 2, can be expected to fetch instructions from the designated jump address. When the processor 304 determines that the fetch is to an authorized BIOS, such as either BIOS 322, 324 in nonvolatile memory 306, the processor 304 may allow the boot process to continue. However, when the processor 304 determines that the expected fetch operation from local memory 306 is occurring on another bus, the processor 304 may intercede to interrupt operation of a device incorporating the security module 300. The interruption may be effected by setting the reset output 328. In another embodiment, when the Power OK signal 330 is connected to an I/O pin on the processor 304, the Power OK signal may be reset, causing the other connected circuits, such as the memory/graphics interface 204, the I/O interface 210, processor 202.

Figure 4:
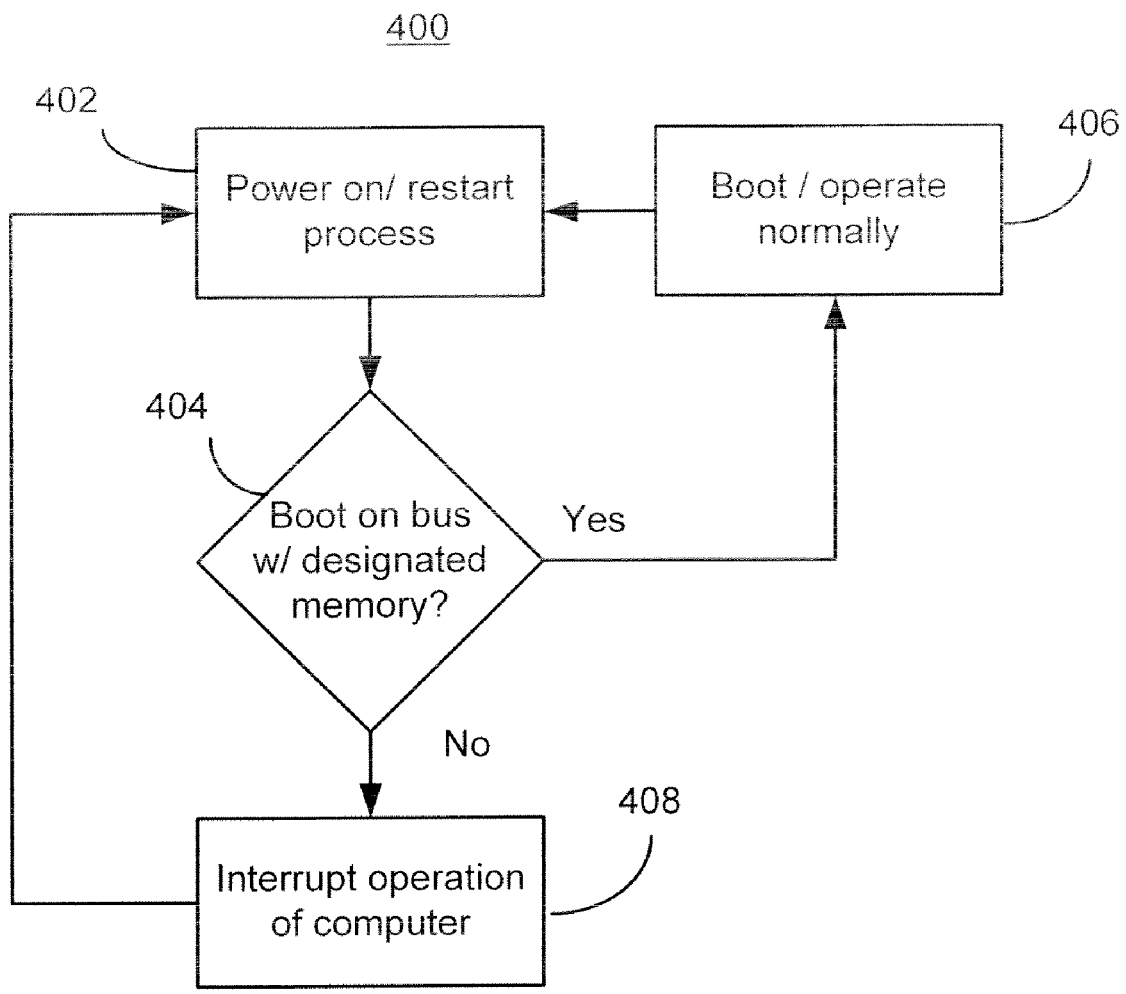
FIG. 4 is a flow chart depicting a method of detecting and stopping booting from a non-authorized location.

FIG. 4, a flow chart depicting a method of detecting and stopping booting from a non-authorized location, is discussed and described. At block 402, a startup process for a computer, such as computer 200 of FIG. 2, may be initiated. The startup process may be a cold boot, from power-on or a warm boot from a hardware or software initiated reset signal. At block 404, a determination may be made whether a previously designated memory is being used to boot the computer 200. The determination may be direct monitoring of the memory itself, such as possible with a security module such as that described with respect to FIG. 3. Alternatively, a system bus attached to the designated memory may be monitored, and when the correct address appears, the designated memory may be assumed. If the designated memory is being used, the 'yes' branch from block 404 may be taken to block 406 where the normal boot process and operation of the computer take place. Upon reset of the computer, operation will resume at block 402.

If at block 404, the determination is made that a bus other than that Supporting the designated memory is operating during the initial boot fetch, the 'no' branch from block 404 may be taken to block 408, where operation of the computer 200 may be interrupted, such as by activating a reset of the computer 200 at block 402.

Many attempts have been made to ensure booting from a known BIOS memory. Virtually all require cryptographic authentication of code loaded from one area to another area, requiring not only the second memory location, but the overhead of cryptographic circuitry or operations. Operation in accordance with the above system and method require no cryptographic authentication and allow operation of the computer to proceed without modification to a standard boot process and standard support chips such as the Northbridge and Southbridge of a standard architecture computer. The addition of a single security module allows security of the computer to be heightened without significant changes to the benefit of a manufacturers and users alike in providing a cost effective secure boot process without the cost in time and hardware of a prior art secure boot.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A boot module for use in enforcing booting from a designated memory, the boot module comprising:
   a processor;
   a memory storing instructions executable by the processor and data corresponding to an authorized boot sequence;
   a plurality ports coupled to the processor for monitoring a corresponding plurality of communication busses including a first bus for carrying signals related to a boot operation from an authorized location, and one or more additional busses capable of carrying signals related to a boot operation from an unauthorized location; and
   an output operable to disrupt operation of a computer when a boot operation from the unauthorized location is detected.

2. The boot module of claim 1, wherein the data corresponding to an authorized boot sequence is basic input/output system software.

3. The boot module of claim 1, further comprising a serial peripheral interface (SPI) bus interface coupled to the memory.

4. The boot module of claim 3, further comprising a coupling allowing the processor to monitor the SPI bus interface.

5. The boot module of claim 1, wherein at least one port of said plurality of ports is coupled to a serial peripheral interface (SPI) bus.

6. The boot module of claim 1, wherein at least one port of said plurality of ports is coupled to a low pin count (LPC) bus.

7. The boot module of claim 1, wherein at least one port of said plurality of ports is coupled to a peripheral component interconnect (PCI/PCIe/PCI-X) bus.

8. The boot module of claim 1, wherein at least one port of said plurality of ports is coupled to a general purpose input/output (GPIO) bus.

9. A method of preventing a boot cycle in a computer from other than a designated memory comprising:
   designating a first memory to support an authorized boot cycle;
   monitoring a data bus coupled to a second memory capable of supporting the boot cycle but unauthorized to execute the boot cycle;
   determining when the boot cycle is being executed from the second memory; and
   interrupting the boot cycle when the boot cycle is being executed from the second memory.

10. The method of claim 9, wherein monitoring the data bus comprises monitoring a low pin count (LPC) bus.

11. The method of claim 9, wherein monitoring the data bus comprises monitoring a serial peripheral interface (SPI) bus.

12. The method of claim 9, wherein monitoring the data bus comprises monitoring a peripheral component interconnect (PCI/PCIe/PCI-X) bus.

13. The method of claim 9, wherein monitoring the data bus comprises monitoring a serial peripheral interface (SPI) bus.

14. The method of claim 9, wherein interrupting the computer boot cycle comprises causing the computer to reset.

15. A computer arranged and adapted to support booting from a known memory containing an authorized basic input/output system (BIOS) code, the computer comprising:
   a first processor;
   a plurality memory devices, each coupled to a respective data bus; and
   a security circuit coupled to at least one of the respective data busses, the security circuit comprising:
   a second processor;
   a memory coupled to the second processor;
   a plurality of ports coupled to the second processor and the respective data busses whereby the second processor monitors the respective data busses; and
   an output that causes a disruption in an operation of the computer responsive to a signal from the second processor when the second processor detects signals on one of the data busses relating to a boot operation from a non-authorized one of the plurality of memory devices.

16. The computer of claim 15, wherein the security circuit further comprises one of the plurality of memory devices that stores an authorized basic input/output system (BIOS) program.

17. The computer of claim 15, wherein the security circuit is coupled to a serial peripheral interface (SPI) bus.

18. The computer of claim 15, wherein the respective data busses comprise a low pin count (LPC) bus, serial peripheral interface (SPI) bus, a peripheral component interconnect (PCI/PCIe/PCI-X) bus, and a a general purpose input/output (GPIO) bus.

19. The computer of claim 15, wherein the output of the security circuit forces the computer into a reset cycle to cause a disruption in the operation of the computer.

* * * * *